INVENTOR
ISTVAN GEBEFÜGI

United States Patent Office 3,357,792
Patented Dec. 12, 1967

3,357,792
KNEADING PRETREATMENT FOR THE PRODUCTION OF ALUMINUM HYDROXIDE
Istvan Gebefügi, Attenhoferstrasse 45, Zurich, Switzerland
Filed Oct. 3, 1966, Ser. No. 583,909
17 Claims. (Cl. 23—143)

This application is a continuation-in-part of application Ser. No. 441,383, filed Mar. 19, 1965, now abandoned.

The present invention relates to pretreatment of ores for the production of aluminum hydroxide according to the well known Bayer process.

According to the Bayer process for the recovery of aluminum hydroxide, ground bauxite is digested in an aqueous solution of sodium hydroxide at high temperature and under pressure, whereupon the insoluble impurities, chiefly iron oxides, are separated by decantation and filtration. Aluminum hydroxide is precipitated from the obtained metastable solution of sodium aluminate by hydrolysis after inoculation with aluminum hydroxide crystals and stirring, and separated from the liquor. The liquor is reconcentrated by evaporation and/or addition of sodium hydroxide and can be recirculated in the process.

Background on the various bauxites and aluminum containing materials utilized in the Bayer process are set out, for example, in the U.S. Patents Nos. 382,505, 2,107,919, 2,143,310, 2,522,605, 3,095,280, 3,112,994, 3,120,996 and 3,127,239.

The Bayer process has the disadvantage that, due to the variety of utilizable bauxites and to the kind and quantity of the impurities contained therein, the time and power consumption needed for the complete digestion and dissolution are very different and vary significantly, or, the temperatures and pressures employed must be changed. In some cases, it is not possible to assure such conditions that the insoluble impurities may be easily separated by filtration and that the aluminum hydroxide can be precipitated without great losses. Lastly, with the known Bayer process, it is not always possible to digest the raw material without applying very high and uneconomical pressures and temperatures.

It has now been found that these disadvantages are overcome to a substantial extent when the ground or finely divided bauxite, that is, any variety of diaspore-boehmitic and/or high silica containing bauxite or other allitic and/or siallitic raw material (for instance certain ashes) is thoroughly kneaded, before digestion, together with at least one alkaline electrolyte and water in a highly plastic consistency and with application of compressive and shearing forces and actions.

The process of the invention accordingly comprises an improvement for treating a ground alumina-bearing raw material, for instance bauxite, according to the Bayer process for producing aluminum hydroxide, by mixing, before the typical digesting steps in the Bayer process, the raw material with at least one electrolyte and a small amount of water and thoroughly kneading the highly plastic mass with compressing and shearing action to swell and disaggregate agglomerated particles contained in the mass at elevated temperature, i.e. 50 to 150° C.

The highly plastic consistency as employed herein is the state in which a plastic material cannot be stirred or not be stirred economically in a usual agitator vessel. In this state the flow or movement of the plastic material ceases almost immediately when the stirrer stops. In the process of the invention, the flow of the plastic material takes place in a kneader developing compressive and shearing forces.

A type of kneader usable for the method according to the invention and developing sufficient compressive and shearing forces is the well-known Ko-Kneader (List system) manufactured by Baker Perkins Inc., Saginaw, Mich., U.S.A. Such a continuously operated kneader is disclosed in the U.S. Patent No. 2,505,125, issued Apr. 25, 1950, to Heinz List, which is incorporated herein by reference, and comprises substantially a casing, a cylindrical worm member rotatable in said casing having interrupted worm threads, projections on the inside surface of said casing for coacting with said interrupted worm threads, said casing being axially reciprocable with said worm whereby a portion of a mass already kneaded is returned to a less kneaded mass for more complete kneading. For several years Ko-Kneaders have been manufactured in which the rotatable worm member is axially reciprocable with the casing. In the Ko-Kneader the plastic material is intensively and continuously kneaded, squeezed and sheared forwards and backwards.

Due to the growing demand for alumina (which is typically obtained by calcining aluminum hydroxide), many inventors have tried to improve the Bayer process or develop other processes for recovering aluminum hydroxide for the purpose of achieving economical processing of low-grade or poorly digestible ores. In many of these processes attempts were made to achieve the goal by way of increased processing temperature. However, due to the high digesting temperatures (170° C. to 250° C), the silica content of the bauxite or other raw material is transformed in greater amounts to sodalites (sodium-aluminum silicates), causing losses and simultaneously raising difficulties, for instance, in decantation, filtration and evaporation operations.

Unlike prior processes, the present process takes into consideration the colloidal characteristics of the different varieties of bauxite and similar raw materials. It seems that during the geological and geochemical periods, depending on prevalent circumstances, colloidal aluminum silicates, kaolines, aluminum hydroxides (hydrargillite, boehmite, diaspore and so forth) were formed in the presence of iron and titanium hydroxides. The primary particles of these materials could have had a size of about 0.5 to 15 millimicrons (5 to 150 angstroms), manifested colloidal properties and constituted incoherent polydispersoid systems. These systems, under the influence of weathering and other factors, later coagulated and agglomerated, forming secondary particles which sedimented. Dispersoid, sedimentation and structural analysis carried out have proved the correctness of the foregoing explanation.

Hence, when processing according to the present invention, the agglomerated secondary particles of the bauxite or similar raw material (consisting generally of aluminum hydroxide $Al_2O_3$.kaolinite $Al_2O_3.2SiO_2.2H_2O$, in association with hydrohematite, titanium hydroxide and so forth, mainly in the xero-gel or xero-gel like or/and microcrystalline state) swell and at the same time disaggregate and disintegrate, freeing the primary elementary particles of aluminum hydroxide, hydrosilicate and so forth. These primary elementary particles possess an active surface which is between $10^3$ and $10^6$ times greater than the particles treated in the usual Bayer process. Consequently, the velocity of the chemical reaction is accordingly higher so that it is possible to effect the digestion of the bauxite treated according to the method of the invention at relatively low temperatures and low pressure at optimum concentrations, or in a shorter time than usual.

In order to disaggregate and disintegrate the secondary particles in the kneader, it is necessary to add to the raw material a suitable alkaline electrolyte and water. The electrolyte and its suitable concentration may be selected according to well-known methods of collodial chemistry. It has been found that in the present case alkali metal hydroxides, such as sodium hydroxide, alkali carbonates, such as sodium carbonate, and alkaline earth hydroxides, such as calcium hydroxide, used alone or in combination, are preferable.

Of course, there are many other alkaline electrolytes which may be used instead of the above mentioned, for example, sodium phosphate or other dispersion agents (also organic dispersion agents).

In the process according to the invention, it is economically suitable to use $Na_2CO_3$, NaOH or $Ca(OH)_2$ as the electrolyte.

It has been found that $Na_2CO_3$ is substantially effective in the range of 0.2% by weight to 5% by weight of the ground ore, preferably in the range of 2 to 3% by weight. NaOH reacts in the same manner as $Na_2CO_3$ and may be used in the same amounts (preferably 2 to 3% by weight of the ore).

$Ca(OH)_2$ is substantially effective only from a minimum amount of 1% by weight upwards. If the silica content of the raw material is higher than about 2% by weight, an additional amount of lime above that necessary as electrolyte should be added in order to bind silica.

In carrying out the process according to the invention, the total moisture of the mixture in the kneader must be adjusted in such a manner that the mixture is still easily kneadable. It has been found that a total moisture content between 18 and 25% by weight (water of constitution not included) is advantageous in obtaining a uniform plastic mixture.

In the case of alumina raw materials with high silica content, for instance Bauxite with more than 2% $SiO_2$ by weight or ashes, it is necessary to add about 0.8 to 1.5 mol CaO for each mol $SiO_2$ to combine with the latter. As CaO binds water, as constitution water in the course of the process, it may be necessary to add more water than the amount needed to obtain at the beginning a moisture content of 25% by weight, in order to ensure the needed plasticity up to the end of the kneading operation; for example, water amounts of about 30% by weight were needed in the case of bauxites with 15% $SiO_2$ by weight and 55% by weight in the case of ashes with about 28% $SiO_2$ by weight.

In many cases, for instance with siallitic raw materials such as some ashes, it is suitable to carry out the kneading according to the invention in several steps. For example, the raw material may be treated in a first step with calcium oxide (which at once reacts with the water added to the ore and is converted to calcium hydroxide) and in a second step with sodium hydroxide and/or sodium carbonate.

It is generally advantageous to store or age (season) the mixture at elevated temperature, for example at the kneading temperature or somewhat below, after kneading and before further treatment, the storing or aging taking place under hydrothermal conditions. If the process is carried out in several steps, a storing or aging may be effected after each step. The suitable temperature range for storing or aging is from 50 to 150° C. (if necessary under the pressure corresponding to the saturation pressure of water at the corresponding temperature). Below 50° C. the reaction times are too long. At higher temperatures than 150° C. undesirable reactions may occur, for example, the formation of calcium aluminum hydrate.

According to the invention, the raw material is converted to a state in which the raw material can be digested at lower temperatures and under lower pressures within a shorter time than usual; furthermore, the impurities can be more easily separated and the filtration of the sodium aluminate containing liquor can be easily effected in order to eliminate therefrom iron oxides and silicates (for instance the red mud). It is therefore easy to oversee the whole process, to control it and possibly to regulate and automate it.

Many instruments and methods for analysis have been invented and developed, e.g. differential thermoanalysis, differential thermogravimetry, X-ray analysis and nuclear magnetic resonance spectroscopy, dispersoid and other methods of sedimentation analysis and so forth, and new colloid-chemical and mineralogical knowledge obtained, yet these have not been utilized in alumina plants up to the present.

In project planning for new alumina plants, the main efforts have been concentrated on raising the capacity of the machine units in order to render the processing operations continuous (i.e. continuous digestion, continuous decantation, continuous precipitation and so forth) and to make each of them automatic.

Due to the changing and variable structural and mineralogical properties of the available bauxite, which have not been very exactly scientifically defined, problems have occurred during processing which could not be solved with the usual automatic equipment and implements; and, especially because of the high silica content, it was not possible up to now to determine by means of computers the greatest possible efficiency of the process.

The process of the invention may be carried out continuously or discontinuously.

The drawings enable a better understanding of the pretreatment according to the invention wherein.

Figure 1:
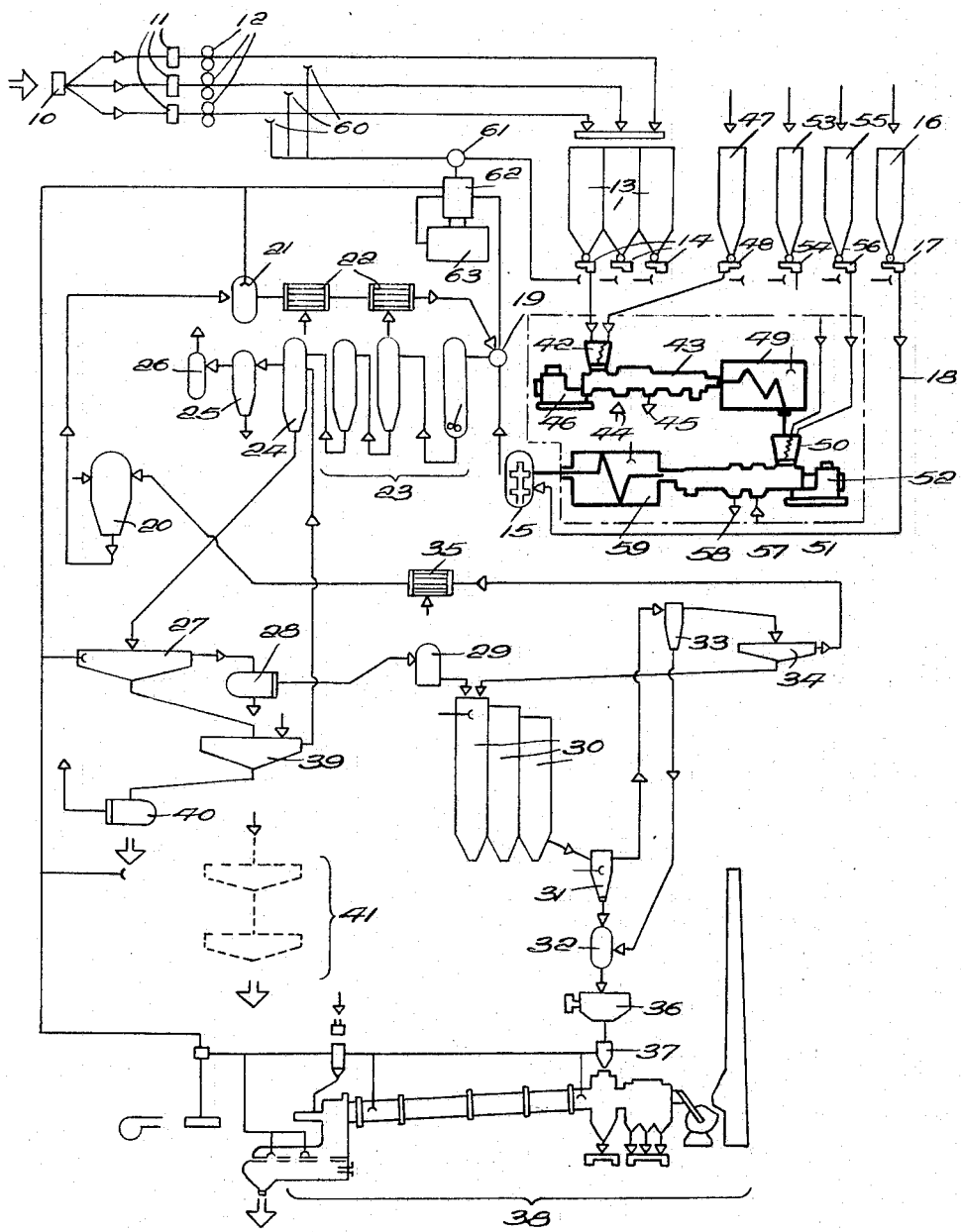
FIG. 1 is a schematic diagram illustrating an alumina plant operable according to the Bayer process and including within the broken lines one example of equipment for carrying out the novel step of the invention.

In FIG. 1, different kinds of bauxite are deposited from source 10. In the plant shown three kinds of bauxite may be processed. The bauxite is at first crushed in crushers 11. The crushed material is then passed through ball mills 12 and is conveyed to storage silos 13. Dosage means 14 are positioned at the bottom of each silo 13. In the course of the usual Bayer process, the ground raw material from dosage means 14 is conveyed directly to slurry mixer 15, in which it is mixed with an adequate quantity of digesting liquor made up mainly of an aqueous solution of sodium hydroxide and sodium aluminate, supplied from storage tank 16 through a dosage pump or means 17 and line 18. Dosage valve or feed means 19 enables the addition of concentrated mother liquor taken from the evaporator 20 to the slurry from slurry mixer 15. The concentrated mother liquor is passed through a testing tank 21, where from time to time samples are taken for analysis, and through heat exchangers 22. The slurry, after being brought to the proper composition or ratio of components in the dosage valve or means 19, is passed to the block of digesters 23 in which the alumina of the raw material is extracted as a sodium aluminate solution at high temperature, for instance at 180 to 250° C. and under a pressure of 6 to 20 atmospheres. Several digesters in the block are usually provided with an outlet for steam.

The digested slurry is then forwarded to dilution tank 24. The top of the latter is connected to a blow-off tank 25, in which the pressure is brought to normal atmospheric pressure. Steam is collected in means 26. In the dilution tank 24, the slurry is diluted by means of wash liquor from mud washers 39 and 41. From the dilution tank 24, the digested slurry flows into the mud settler 27. The substantially cleared liquor is forwarded from the mud settler 27 through a control filter 28 and introduced into cooling means 29, a so-called vacuum flash cooler, in which the liquor is cooled under reduced atmospheric pressure. The cooled liquor flows into several precipitators 30, in which the sodium aluminate is hydrolyzed and the major part of the aluminum hydroxide precipitated. From the precipitators 30 the precipitate as well as the remaining liquor are passed into a primary classifier 31, from which the precipitated aluminum hydroxide is pumped into an aluminum hydroxide storage tank 32. Overflow from classifier 31 is pumped into a second classifier 33 and further to a third classifier 34. The aluminum hydroxide settled in the second classifier 33 is forwarded to the storage tank 32. The aluminum hydroxide settled in the third classifier 34 is used as inoculating agent in the precipitators 30. The overflow (mother liquid) from the third classifier 34 is pumped through a heat exchanger 35 into evaporator 20.

Since most of the aluminum hydroxide produced is used for aluminum production as aluminum oxide, it is necessary to calcinate it. For this purpose, it is passed firstly through rotary filters 36, of which only one is shown, then through a dosage balance or means 37 into a conventional rotary calcining kiln 38.

The mud settled in the mud settler 27 flows into a mud washer 39, in which it is stirred with water. The washing liquor is pumped from the mud washer 39 into the diluting tank 24. The washed mud is forwarded either into mud filter 40 or passes a set of further mud washers 41.

As stated above, one example of equipment usable for carrying out the improvement according to the invention is set out in the diagram. Instead of being forwarded straight from the storage silos 13 through the dosage balances or means 14 to slurry mixer 15, the raw material is introduced through a funnel 42 comprising a mixer, for example a wormgear, into a first kneader 43 as for example a Ko-Kneader as described above. Steam or hot water is passed at 44 into a heating jacket (not shown), of the kneader 43 and passed out through an inlet therefrom at 45. Drive means 46, e.g. an electric motor, drives a cylindrical worm member (not shown) of the kneader. Alkaline electrolyte stored in tank 47 flows through a dosage balance or means 48 into funnel or inlet means 42 and kneader 43. After kneading for a suitable time the resulting plastic mixture leaves the kneader 43 and is introduced into steam chamber 49, similar to those which are used for the hydrothermal treatment of prefabricated concrete building elements. After hydrothermal treatment in the steam chamber 49, the plastic mixture is introduced through funnel or inlet means 50 into a second kneader 51, the cylindrical worm member of which (not shown) is driven by a suitable drive means or electric motor 52. Simultaneously, quicklime (CaO), dry slaked lime

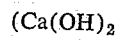

killed lime or calcium hydroxide) flows from the storage silo 53 through a dosage balance or means 54 and funnel 50 comprising a mixture into the kneader 51. Sodium hydroxide solution is stored in the tank 55. A calculated quantity of the solution in tank 55 is introduced continuously through a dosing pump 56 and funnel 50 into the kneader 51 simultaneously with the mixture from steam chamber 49 and dry slaked lime from the storage silo 53. Also the kneader 51 is provided with an inlet 57 and an outlet 58 for steam or hot water. It will be appreciated that other suitable heating means may be used in place of the steam or hot water passed into kneader 43 at 44 or into kneader 51 at 57. From the kneader 51 the mixture is introduced into a second steam chamber 59 and there hydrothermally treated. After this pretreatment (given as an example) the mixture reaches the slurry mixer 15 and is treated in subsequent steps according to the Bayer process.

Various measuring and sampling means 60, 61, 62 and 63 may be employed for sampling and/or for measuring the temperature, pressure, concentration, dispersion grade and so on at designated points in the process. Specifically according to the embodiment set out in FIG. 1 the three sampling means 60 take samples of raw material at predetermined ranges of time. The samples are concentrated at the central sampling point or means 61, to which samples are also forwarded taken from the storage silos 13 or from any spot of the whole plant. All samples concentrated in means 61 are analyzed, for example, by means of an X-ray fluorescence or a nuclear-magnetic resonance spectroscope or other suitable analytical means 62. The figures and data obtained by analysis in means 62 are stored in computer 63, which gives the necessary impulses for the automatic control of the plant. The analysis of the already partly dispersed samples taken from the storing or aging chamber 49 is most convenient for the automatic control. Based on the results of the analysis the addition of lime from the storage silo 53 and of digesting liquor from the storage tank 16, the temperature and the processing time in the kneader 51 and the steam chamber 59, the digesting temperature and pressure in the digesters 23 and so on can all be regulated to the optimum and most efficient levels. The above mentioned spectroscopes, sampling and measuring means are conventional.

Figure 2:
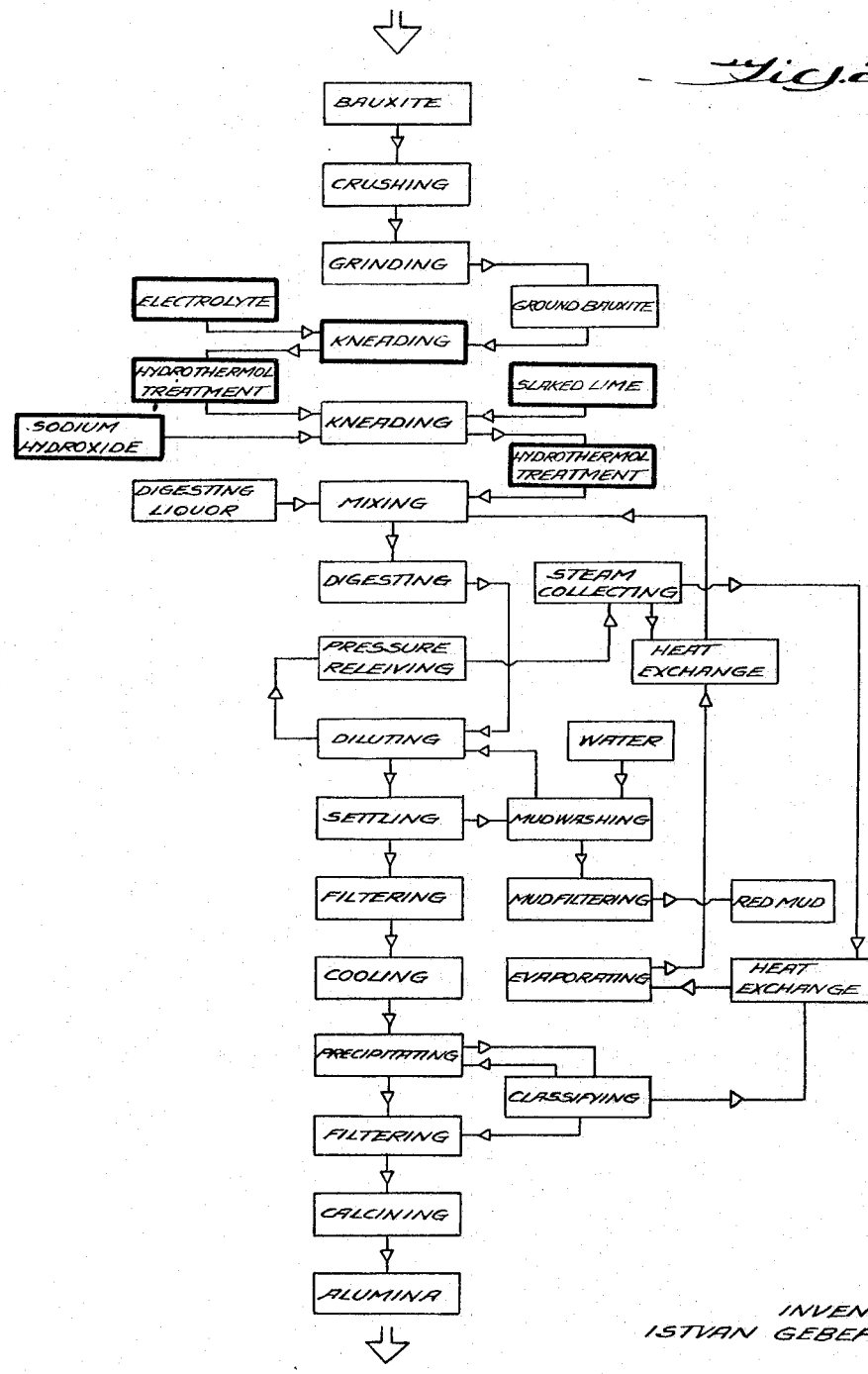
FIG. 2 is a flow diagram of the Bayer process including the dispersion and activation pretreatment step of the invention using the example of equipment shown within the broken lines in FIG. 1.

The process of the invention as set out in FIGURE 2 is shown having novel elements of the process set out in heavy lines comprising successively a first kneading step, a first hydrothermal step, a second kneading step and a second hydrothermal treatment step before passing the resulting pretreated composition to the step in which digesting liquor is added. It will be appreciated that the process is not limited to a double kneading and hydrothermal pretreatment as shown in FIGURE 2. A single kneading and hydrothermal pretreatment step is suitable when the starting ore has properties requiring only such a single pretreatment step. Also, if necessary, multiple kneading and hydrothermal treatment steps may be employed. The flow diagram in FIGURE 2 generally corresponds to the process as in FIGURE 1.

The following examples further illustrate the process of the invention.

Example 1

A bauxite ore substantially of the following composition was treated according to the process of the invention:

| | Percent by weight |
|---|---|
| $Al_2O_3$ | 52 |
| $SiO_2$ | 7 |
| $Fe_2O_3$ | 20 |
| $TiO_2$ | 2.6 |
| Others | 0.4 |
| Loss of ignition | 18 |
| | 100 |

Substantially half of the available $Al_2O_3$ content was boehmite (alumina monohydrate or $\gamma$-AlOOH) and the other half hydrargillite (alumina trihydrate or

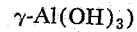

The $SiO_2$ was present in the form of kaolinite (china clay or kaolin $Al_2O_3 \cdot 2SiO_2 \cdot 2H_2O$).

The bauxite was treated as shown schematically in FIGURE 1. After conventional crushing in crushers 11, grinding in ball mills 12 to a fineness whereby about 40% by weight remains on an ASTM sieve No. 200 (having sieve openings of 0.074 millimeter or 0.0029 inch) and sampling in samplers 61, the bauxite was analyzed by means of an X-ray fluorescent spectroscope 62 and transported to the storage silos 13. From these silos 2300 kg. of the bauxite were fed through a dosage balance 14 and through funnel 42 into the first kneader 43. The kneader 43 in this instance was a Ko-Kneader. Simultaneously 190 kg. of CaO as quicklime were fed from storage silo 47 through dosage balance 48 and funnel 42 into Ko-Kneader 43 as well as water through a pipe (not shown in FIGURE 1) and funnel 42 comprising a mixer roughly indicated as a wormgear.

The bauxite in the kneader thus contained 7.6% CaO by weight. The lime, after slaking, was used partly as alkaline electrolyte and partly for combining with the silica present in the ore. The resulting bauxite-lime mixture was intensively kneaded for 10 minutes at atmospheric pressure and heated to 95° C. in kneader 43. The resulting mass was then conveyed directly to slurry mixer 15 through a pipe (not shown in FIGURE 1) and processed in subsequent stages according to the Bayer process.

As a consequence of the pretreatment according to this example the time for digesting the bauxite in digesters 23 was reduced by about 25% (from 8 to 6 hours) when temperature, pressure and concentration of the digesting liquor were the same as in the usual Bayer process applied to the same bauxite but without pretreatment according to the invention; moreover the alkali losses were reduced by about 30 to 50%.

*Example 2*

2300 kg. of the same bauxite ore as in Example 1 crushed and ground in the same way and to the same fineness, were fed through dosage balance 14 through a by-pass conveyer (not shown in FIGURE 1) and through funnel 50 into Ko-Kneader 51. Simultaneously 190 kg. CaO, in the form of slaked lime, were fed from storage silo 53 through dosage balance 54 and funnel 50 into kneader 51, as well as an aqueous solution of 230 kg. NaOH from storage tank 55 through dosage balance 56, the NaOH solution having such a concentration that the mixture of bauxite, lime and sodium hydroxide in kneader 51 was well kneadable, that is to say that said mixture had a moisture content of about 25% water by weight (water of constitution not included). The quantity of lime added was sufficient to combine with the silica ($SiO_2$) present in the raw material. In the kneader 51 the mixture was kneaded for 10 minutes and heated to 95° C. at atmospheric pressure. After kneading the resulting mass was conveyed directly to slurry mixer 15 through a by-pass (not shown in FIGURE 1) and processed in subsequent stages according to the Bayer process. As a consequence of the pretreatment according to this example the time for digesting the buxite in digesters 23 was reduced by about 35% (from 8 to about 5.5 hours) when temperature, pressure and concentration of the digesting liquor were the same as in the usual Bayer process applied to the same bauxite but without pretreatment according to the invention; moreover, the alkali losses were reduced by about 35 to 55%.

*Example 3*

The following example is directed to the pretreatment of bauxite according to Example 1 but utilizing an additional hydrothermal treatment.

The bauxite treated in this example had substantially the following composition:

| | Percent by weight |
|---|---|
| $Al_2O_3$ | 53 |
| $SiO_2$ | 8 |
| $Fe_2O_3$ | 24 |
| $TiO_2$ | 2.5 |
| Others | 0.5 |
| Loss of ignition | 12 |
| | 100 |

The available $Al_2O_3$ content was boehmite (alumina monohydrate or $\gamma$-AlOOH). The $SiO_2$ was present in the form of kaolinite.

After conventional crushing in crushers 11, grinding in ball mills 12 to a fineness whereby about 40% remained on the ASTM sieve No. 200 (having sieve openings of 0.074 millimeter or 0.0029 inch) and sampling in samples 61, the bauxite was analyzed by means of an X-ray fluorescent spectroscope 62 and transported to storage silos 13. From these silos 2250 kg. of bauxite were fed through a dosage balance 14 and through a funnel 42 into the kneader 43. Simultaneously 220 kg. CaO were forwarded from silo 47 into funnel 42 together with about 700 liters of water from a source not shown in FIGURE 1. The water added was sufficient to react with the lime to convert the calcium oxide to calcium hydroxide and to make the resulting mixture of bauxite and slaked lime well kneadable, i.e., a moisture content about 25% by weight (water of constitution not included). The slaked lime was used in this example partly as alkaline electrolyte and partly for combining with the silica present in the ore. The resulting bauxite-lime mixture was intensively kneaded for 10 minutes at atmospheric pressure and heated at 95–100° C. in kneader 43. For the kneading of the mixture of 2250 kg. of bauxite and about 290 kg. of slaked lime the electric motor 46 consumed about 4.8 kilowatts. The resulting mixture was then fed into steam chamber 49 and stored or aged there under hydrothermal conditions at a temperature of 90–95° C. and at atmospheric pressure for 6 hours. Thereafter, the mixture, pretreated in this way, was conveyed directly to slurry mixer 15 through a by-pass not shown and processed in subsequent stages according to the Bayer process.

As a consequence of the pretreatment according to this example the time for digesting the bauxite in digesters 23 was reduced by about 50% (from 8 to 4 hours) when temperature, pressure and concentration of the digesting liquor were the same as in the usual Bayer process applied to the same bauxite but without pretreatment according to the invention.

*Example 4*

2250 kg. of the same bauxite as in Example 3 were treated in the same way as in Example 3, but the resulting mass, instead of being conveyed directly to slurry mixer 15, was fed through funnel 50 into Ko-Kneader 51; simultaneously an aqueous solution of 250 kg. sodium hydroxide NaOH was fed from storage tank 55 through dosage balance 56, the sodium hydroxide solution having such a concentration that the mixture of bauxite and lime in the kneader 51 was still well kneadable, that is to say that said mixture had a moisture content of about 25% by weight (water of constitution not included). In the kneader 51 the mixture was kneaded at a temperature of 95° C. and at atmospheric pressure for 10 minutes. Thereafter, the resulting mass was conveyed directly to slurry mixer 15 through a by-pass not shown and processed in subsequent stages according to the Bayer process.

As a consequence of the pretreatment according to this example the time for digesting the bauxite in digesters 23 was reduced by about 55% (from 8 hours to about 3.5 hours) when temperature, pressure and concentration of the digestion liquor were the same as in the usual Bayer process applied to the same bauxite but without pretreatment; moreover, the alkali losses were reduced by about 35 to 55%.

*Example 5*

2300 kg. of the same bauxite ore as in Example 1, crushed in the same way, were fed through the dosage balance 14 and through the funnel 42 into the kneader 43. Simultaneously 15 kg. of NaOH at a 10% aqueous solution were fed as electrolyte from storage tank 47 through dosage balance 48 and funnel 42 into kneader 43. The bauxite in kneader 43 thus contained about 0.65% NaOH by weight. The bauxite-electrolyte mixture was intensively kneaded at atmospheric pressure for 5 minutes and heated to 50–85° C. The resulting mixture was then fed into the steam chamber 49 and stored and aged in it under hydrothermal conditions at a temperature of 50 to 80° C. and at atmospheric pressure for 3 days, thereafter the mixture was fed through the funnel 50 into the second Ko-Kneader 51 and mixed in it with 190 kg. CaO in the form of quicklime supplied from the storage silo 53 through the dosage balance 54 as well as with water from the storage tank 55 through the dosage balance in such an amount that the mixture of bauxite and lime in the Ko-Kneader 51 was still well kneadable, that is to say that the mixture had a moisture content of 30% by weight (water of constitution not included) at the beginning of the kneading. The quantity of lime added was sufficient to combine with the silica ($SiO_2$) present in the raw material. In the kneader 51 the mixture was kneaded and heated to 95° C. for 10 minutes at atmospheric pressure. After kneading the mixture was fed into the steam chamber 59 where it remained for 3 hours at 150° C. and at steam pressure under hydrothermal conditions. Thereafter the resulting mass was conveyed to slurry mixer 15 as in example 1.

*Example 6*

2300 kg. of the same bauxite as in Example 1, crushed and ground in the same manner, were fed from storage silos 13 through dosage balance 14 and through funnel 42 into the first kneader 43 (Ko-Kneader). Simultaneously 80 kg. of $Na_2CO_3$ as a 10% aqueous solution were fed as electrolyte from the storage tank 47 through the dosage balance 48 and the funnel 42 into the kneader 43. The bauxite in the kneader 43 thus contained about 3.4% $Na_2CO_3$ by weight. The bauxite-electrolyte mixture was intensively kneaded at atmospheric pressure for 5 minutes and heated to 95–100° C. For the kneading of the 2300 kg. of bauxite the electric motor 46 consumed about 2.4 kilowatts of electricity. The resulting mixture was then fed into the steam chamber 49 and stored and aged in it under hydrothermal conditions at a temperature of 90 to 95° C. and at atmospheric pressure for 3 hours. Thereafter, the mixture was fed through the funnel 50 into the second kneader 51, which was also a Ko-Kneader, and mixed in the said second kneader with 190 kg. CaO in the form of dry slaked lime supplied from the storage silo 53 through the dosage balance 54 as well as with an aqueous solution of 430 kg. sodium hydroxide supplied from the storage tank 55 through the dosage balance 56, the sodium hydroxide solution having such a concentration that the mixture of bauxite, sodium carbonate and lime in the kneader 51 was still well kneadable, that is to say that it had a moisture content between 18 and 25% by weight (water of constitution not included at the end of the kneading). The quantity of lime added was sufficient to combine with the silica ($SiO_2$) present in the raw material to form monocalcium silicate as well as for transforming the sodium carbonate present in the kneaded mixture introduced into the kneader 51 to sodium hydroxide. The quantity of sodium hydroxide selected was sufficient for the digestion of the $Al_2O_3$ present as hydrargillite (alumina trihydrate). The digesting liquor from the storage tank 16, instead of water, can be used to make the sodium hydroxide solution. In such a case the sodium hydroxide of the digesting liquor must be taken into consideration. In the kneader 51 the mixture was heated to 105–125° C. and kneaded for 10 minutes at the pressure of steam at the temperature of the mixture in kneader 51. The electric motor 52 consumed about 3.8 kilowatts of electricity. After kneading the mixture was fed into the steam chamber 59, where it remained for 3 hours at 90–98° C. and at atmospheric pressure under hydrothermal conditions. Thereafter the mixture was conveyed to slurry mixer 15 which, as stated above, is a part of a usual plant for the recovery of aluminum hydroxide according to the Bayer process. In addition to the kneaded mixture digesting liquor from storage tank 16 was introduced into said slurry mixer 15 through the dosage balance 17 and the line 18 as well as further sodium hydroxide needed for adjusting the proper concentration of the digesting liquor. The slurry was then processed as set out in FIGURE 2 in subsequent steps according to the Bayer process.

As a consequence of the pretreatment according to the invention the time for digesting the bauxite in digesters 23 was substantially reduced, i.e., two-thirds (from 8 to 2½ hours) when temperature, pressure and concentration of the digesting liquor were the same as in the usual Bayer process applied to the same bauxite, but without pretreatment according to the invention.

*Example 7*

The same bauxite as in Example 1 in the same degree of fineness was kneaded in a mixer-extruder of the kind described in Chemical Engineer's Handbook (McGraw-Hill Book Company Inc., New York), Fourth Edition, 1963, pages 19–35 (FIGS. 19–60), in which mixer-extruder the material was subjected to shearing, rubbing and kneading. The kneading time was 15 minutes at a temperature of 95–100° C. at atmospheric pressure. As in Example 2, slaked lime was used as an electrolyte in the same quantities. The subsequent treatment in the steam chamber was the same as in Example 3. Thereafter, the mixture pretreated in this way was conveyed directly to the slurry mixer and processed according to the Bayer process in subsequent stages. The time for digesting was reduced by about 40% compared to the normal Bayer process without pretreatment according to the invention.

*Example 8*

The following example is directed to the pretreatment of bauxite according to Example 3, but carrying out a second kneading operation in kneader 51 after the hydrothermal treatment and addition of an aqueous solution of 430 kg. sodium hydroxide from storage tank 55 through balance 56 and funnel 50, the sodium hydroxide having such a concentration that the mixture of bauxite, lime and sodium hydroxide in the kneader 51 was still well kneadable. In the kneader 51 the mixture was heated to 105–125° C. and kneaded for 10 minutes at the pressure of steam at the temperature of the mixture in kneader 51. After kneading the mixture was fed into steam chamber 59, where it remained for 3 hours at 150° C. and at steam pressure under hydrothermal conditions. Thereafter the resulting mass was conveyed through the slurry mixer 15 to the digester 23 and there digested at 250° C. with a liquor concentration of 250 to 450 g./l. sodium oxide. After digestion during 3 to 1 hours the slurry was quickly filtered in a pressure filter and the mud diluted and stirred at 80° C. with an alkali solution containing 35 to 55 g./l. sodium oxide as sodium hydroxide and sodium carbonate during 12 to 3 hours; the further treatment was according to the Bayer process.

*Example 9*

In the following example the same bauxite was used as in Example 3.

After conventional crushing in the same manner as in Example 3, 2250 kg. of bauxite were fed from silos 13 through dosage balances 14 and through funnel 42 into kneader 43. Simultaneously 220 kg. CaO (quicklime) were forwarded from silo 47 into funnel 42 together with about 700 liters of water and a solution of 430 kg. $Na_2O$ (sodium oxide) from sources not shown in FIGURE 1, the sodium oxide resulting from reaction of $Na_2O$ with water having such a concentration that the mixture of bauxite, lime and sodium hydroxide in the kneader 43 was still well kneadable. In the kneader 43 the mixture was heated to 105–125° C. and kneaded for 10 minutes at the pressure of steam at the temperature of the mixture in kneader 43. After kneading the mixture was fed into steam chamber 49 where it remained for 3 hours at 150° C. and a steam pressure under hydrothermal conditions. Thereafter the resulting mass was conveyed through the slurry mixer 15 to the digester 23 and there digested at 250° C. with a liquor concentration of 250 to 450 g./l. sodium oxide. After digestion during 2 to 1 hours the slurry was quickly filtered in a pressure filter and the mud diluted and stirred at 80° C. with an alkali solution containing 35 to 55 g./l. sodium oxide as sodium hydroxide and sodium carbonate during 12 to 3 hours. The further treatment was according to the Bayer process.

In these nine examples the time of the kneading was 5, 10 or 15 minutes. This means that the bauxite-electrolyte mixture remained respectively 5, 10 or 15 minutes in the operating kneader or mixer-extruder. Of course, the time of kneading depends substantially on the physical, chemical, rheological and mineralogical properties of the ore as well as on the temperature, on the electrolyte concentration and on other factors, and may easily be determined in laboratory tests. Generally, a duration of 5 minutes seems to be the lowest practical time limit. The upper limit of the kneading time depends only on economical considerations.

The kneading temperature also depends on many factors, chiefly on economical considerations. If the kneader is not provided with an equipment enabling working under steam pressure, the most advantageous temperature for kneading is between about 85 and about 100° C., but it is also possible to apply temperatures down to 50° C. or even lower temperatures. If a kneader enabling working under steam pressure is used, the kneading may be carried out at a temperature over 100° C., for instance between 105 and 125° C. Moreover, a still higher temperature may be taken into consideration, for instance up to 250° C.

In the pretreatment of many alumina-bearing raw materials, especially siallitic raw-materials, according to the invention a substantial amount of moisture becomes bound as constitution water during kneading or aging, so that the plasticity of the mass diminishes. In order to control the necessary moisture content it has been found advantageous to inject hot water and/or steam into the mass during kneading and/or aging. Furthermore it has been found that the injection of steam seems to accelerate the process.

The process according to the invention has been disclosed as pretreatment of ores for the production of aluminum hydroxide according to the Bayer process. However, it is also useful as pretreatment of ores for the production of aluminum hydroxide according to modified Bayer processes, to low-temperature calcium-aluminate processes and other processes.

Having described only typical forms of the invention, I do not wish to be limited to the specific details herein set forth, but wish to reserve to myself any variations and modifications that may appear to these skilled in the art and/or fall within the scope of the following claims.

I claim:

1. In a process for pretreating a ground alumina-bearing raw material for producing aluminum hydroxide according to the Bayer process, in which process said alumina-bearing raw material passes through a digesting step, the improvement comprising, before said digestion step, mixing said alumina-bearing raw material with at least one alkaline electrolyte and water, thereby forming a mass having a highly plastic consistency and thoroughly kneading said mass with compressing and shearing action to swell and disaggregate agglomerated particles of the said alumina-bearing raw material.

2. A process as in claim 1 wherein the moisture content of said mass having a highly plastic consistency is about 18 to 25% by weight and the temperature of the said mass is maintained at about 85 to 100° C. during kneading.

3. A process as in claim 1 wherein the moisture content of said mass having a highly plastic consistency is about 18 to 25% by weight; said kneading is carried out for a few minutes; and, the temperature of the mass is maintained at about 85–100 C. during said kneading.

4. A process as in claim 1 wherein the said mass having a highly plastic consistency is formed by mixing the ground alumina-bearing raw material with at least one electrolyte and water and has a moisture content of about 18 to 25% by weight; is thoroughly kneaded with compressing and shearing action at a temperature of about 85–100° C. and then aged under hydothermal conditions at elevated temperature.

5. A process as in claim 1 wherein the said mass having a highly plastic consistency is formed by mixing the ground alumina-bearing raw material with an electrolyte and water; then is thoroughly kneaded with compressing and shearing action, is aged under hydrothermal conditions at elevated temperature and thereafter kneaded again.

6. A process as in claim 1 wherein the said mass having a highly plastic consistency is formed by mixing the ground alumina-bearing raw material with an electrolyte and water; then is thoroughly kneaded with compressing and shearing action, is aged under hydrothermal conditions at elevated temperature, is then kneaded and aged again in at least one additional kneading and aging step.

7. A process as in claim 1 wherein the alkaline electrolyte comprises at least lime.

8. In a process for pretreating a ground alumina-bearing raw material for producing aluminum hydroxide according to the Bayer process, in which process said alumina-bearing raw material passes through a digesting step, the improvement comprising, before said digesting step, mixing said alumina-bearing raw material with an alkaline electrolyte comprising at least lime and water, thereby forming a mass having a high plastic consistency and binding silica contained in the raw material, thoroughly kneading said mass with compressing and shearing action at a temperature between 50 and 125° C. to swell and disaggregate particles of the said alumina-bearing raw material and thereafter aging said mass at a temperature between 50 and 150° C. under hydrothermal conditions.

9. A process as in claim 8 comprising the addition of sodium hydroxide to the mass after aging under hydrothermal conditions and kneading the said mass again at a temperature between 50 and 125° C.

10. In a process for pretreating a ground alumina-bearing raw material for producing aluminum hydroxide according to the Bayer process, in which process said alumina-bearing raw material passes through a digesting step, the improvement comprising, before said digesting step, mixing said alumina-bearing raw material with lime and water, thereby forming a mass of highly plastic consistency and binding silica contained in the raw material, thoroughly kneading said mass in a first kneader with compressing and shearing action at a temperature between 50 and 125° C. to swell and disaggregate particles of the said alumina-bearing raw material, thereafter aging said mass at a temperature between 50 and 150° C. under hydrothermal conditions, then conveying the mass to a second kneader, adding a sodium hydroxide solution having such a concentration that the mixture of bauxite, lime and sodium hydroxide is still well kneadable, kneading the mass at a temperature between 50 and 125° C., thereafter aging said mass under hydrothermal conditions at a temmerature between 50 and 150° C.

11. In a process for pretreating a ground alumina-bearing raw material for producing aluminum hydroxide according to the Bayer process, in which process said alumina-bearing raw material passes through a digesting step, the improvement comprising, before said digestion step, mixing said alumina-bearing raw material with lime, water and a solution of sodium hydroxide, forming a mass of highly plastic consistency and binding silica contained in the raw material, thoroughly kneading said mass with compressing and shearing action at a temperature between 50 and 125° C. to disaggregate particles of the said alumina-bearing raw material, thereafter aging said mass at a temperature between 50 and 150° C. under hydrothermal conditions.

12. In a process for pretreating a ground alumina-bearing raw material for producing aluminum hydroxide, the improvement comprising mixing said alumina-bearing material with at least one alkaline electrolyte and water, thereby forming a mass having a highly plastic consistency and thoroughly kneading said mass with compressing and shearing action to swell and disaggregate agglomerated particles of the said alumina-bearing raw material.

13. A process as in claim 12, in which process the kneading is carried out at a temperature between 50 and 250° C.

14. A process as in claim 12, in which process the kneading is carried out at a temperature between 85 and 100° C.

15. A process as in claim 12, in which process the kneading is carried out at a temperature between 100 and 125° C. under steam pressure.

16. A process as in claim 12, comprising aging the highly plastic mass at a temperature between 50 and 150° C. after kneading.

17. A process as in claim 12, wherein the said mass having a highly plastic consistency is formed by mixing the ground alumina-bearing raw material with an electrolyte and water; then is thoroughly kneaded with compressing and shearing action, is aged under hydrothermal condition at elevated temperature, is then kneaded and aged again in at least one additional kneading and aging step.

References Cited

UNITED STATES PATENTS

| | | | |
|---|---|---|---|
| 1,422,004 | 7/1922 | Sherwin | 23—141 |
| 1,856,194 | 5/1932 | Seailles | 23—143 |
| 2,544,231 | 3/1951 | Hollum et al. | 23—143 |

FOREIGN PATENTS 283,509    6/1928    Great Britain.

MILTON WEISSMAN, *Primary Examiner.*

G. T. OZAKI, *Assistant Examiner.*